United States Patent [19]

Li et al.

[11] 3,740,315

[45] June 19, 1973

[54] PROCESS FOR THE REACTION AND SEPARATION OF COMPONENTS UTILIZING A LIQUID SURFACTANT MEMBRANE AND AN ENZYME CATALYST

[75] Inventors: Norman N. Li, Edison; Raam R. Mohan, Berkeley Heights, both of N.J.; Donald R. Brusca, Falls Church, Va.

[73] Assignee: Esso Research and Engineering Company, Linden, N.J.

[22] Filed: May 7, 1971

[21] Appl. No.: 141,367

[52] U.S. Cl. .................. 195/2, 208/308, 195/104, 195/49
[51] Int. Cl. ............................................... C12b 1/00
[58] Field of Search ...................... 195/2, 104, 105, 195/106, 107, 116; 208/308

[56] References Cited
UNITED STATES PATENTS
3,389,078    6/1968    Elzinga et al. ...................... 208/308

OTHER PUBLICATIONS

Michaels, Chem. Eng. Progress Vol. 64, p. 31–43, 1968.

*Primary Examiner*—A. Louis Monacell
*Assistant Examiner*—Gary M. Nath
*Attorney*—Chasan & Sinnock and John Paul Corcoran

[57]     ABSTRACT

Components of a feedstream are reacted and separated by a liquid membrane process which utilizes an enzyme as the catalyst for the reaction. The enzyme may be present in the feedstream, solvent, or liquid membrane phase; preferably the enzyme will be in an aqueous phase. In a preferred embodiment, an aqueous feedstream, containing phenol, is contacted with a liquid surfactant membrane comprising a high molecular weight isoparaffin and sorbitan monooleate surrounding an aqueous interior phase comprising polyphenol oxidase, whereby the phenol permeates the liquid surfactant membrane and is oxidized in the interior phase.

60 Claims, No Drawings

PROCESS FOR THE REACTION AND SEPARATION OF COMPONENTS UTILIZING A LIQUID SURFACTANT MEMBRANE AND AN ENZYME CATALYST

BACKGROUND OF THE INVENTION

1. Field of the Invention

Components of a feedstream are reacted and separated by a liquid membrane process which utilizes an enzyme as the catalyst for the reaction. The enzyme may be present in the feedstream, solvent, or liquid membrane phase; preferably the enzyme will be in an aqueous phase. In a preferred embodiment, an aqueous feedstream containing phenol is contacted with a liquid surfactant membrane comprising a high molecular weight isoparaffin and sorbitan monooleate surrounding an aqueous interior phase comprising polyphenol oxidase, whereby the phenol permeates the liquid surfactant membrane and is oxidized in the interior phase.

2. Prior Art

The prior art processes which utilize enzymes as catalysts suffer from one major disadvantage. The enzymes are very expensive, cannot survive extremes of acidity or alkalinity at high temperatures, and are difficult, if not impossible, to separate from the reaction mixture.

The usual practice in industry is to use the enzymes in a batch process. In other words, enzymes are added to the reactant mixture and remain suspended in the reaction products where they are lost for reuse.

A new process has been reported wherein the enzymes are held separate from the reactants by a semipermeable solid membrane which allows the diffusion of reactants through membrane, to contact the enzyme, and the diffusion of reaction products away from the enzyme. This process is subject to the usual difficulties of use encountered with solid membranes, e.g., "pinholes" which frequently occur in solid membranes allow the enzymes to permeate into the reaction mixture, where they are lost for reuse. This has been overcome, in recent years, by successfully binding a variety of enzymes to inert supports such as dextran gel (Sephadex), crosslined acrylic polymers (Biogel), polyamino acids, various kinds of cellulose and glass. There are three principal methods for binding enzymes to matrixes. Covalent chemical linkage, adsorption (attraction of opposite electric charges), and entrapment of the enzyme within a gel lattice.

In the separation of liquid mixtures, a new process has recently been disclosed. Said process has been termed liquid membrane separation process, and is described in U.S. Pat. No. 3,410,794. In this process hydrocarbons having similar physical or chemical properties are separated by diffusion through a liquid surfactant membrane which is permeable to the components that are desired to be separated from the feedstream. A case has recently been filed which describes an improvement over this basic liquid membrane separation process. In that case (Serial No. unknown) a solubilizing additive is incorporated in the liquid membrane to increase the permeability of the membrane to the desired components of feedstream. This case is based on the concept of increasing the solubility of the desired components in the liquid membrane and thereby increasing the rate of diffusion through said liquid membrane.

SUMMARY OF THE INVENTION

According to this invention, it has unexpectedly been discovered that an improved process for reaction and separation of specific components of a feedstream can be achieved by utilizing a liquid surfactant membrane for the separation and an enzyme catalyst for the reaction. In this process an emulsion is made of the feedstream by processes known in the art, see for example U.S. Pat. No. 3,410,794, hereby incorporated by reference, and the emulsion is contacted with a solvent phase which is selectively soluble for at least one component of the feedstream. The desired component permeates through the liquid surfactant membrane and is reacted in the solvent phase by contact with the enzyme catalyst which is present in the solvent phase. The enzyme catalyst may also be present in the liquid surfactant membrane itself, in which case the solvent will be chosen to selectively solubilize the desired reaction product. In this case the component of the feedstream permeates into the liquid surfactant membrane where it is reacted and the reaction product passes into the solvent phase. In another embodiment, the enzyme catalyst is combined with the feedstream before emulsification and then contacted with the solvent, which is specifically soluble for the desired reaction product. In this case, the liquid membrane will be chosen with regards to the reaction product or products which are desirable to separate from the feedstream-enzyme mixture.

It is also possible to carry out the above process in reverse, i.e., the solvent can be the interior phase which is emulsified and the feedstream then contacted with the above described emulsion. In this case the enzyme catalyst can also be present either in the feedstream, in the liquid surfactant membrane, or in the interior solvent phase. Depending on the reaction and separation desired, the skilled artisan will choose whichever variation is more suitable.

The liquid surfactant membrane will comprise one or more surfactants, which can be either soluble in aqueous or nonaqueous solutions, and a solvent if needed for the surfactants. Sometimes, additives are also incorporated in the membrane for various purposes as discussed later. When the feedstream is of an aqueous nature, of course, the liquid surfactant membrane will be a nonaqueous phase. In this case, a surfactant which is soluble in the nonaqueous phase must be chosen. When the feedstream, on the other hand, is nonaqueous, the liquid surfactant membrane must be an aqueous phase and the surfactant soluble therein.

A wide variety of surfactants can be used in the process of the instant invention. These surfactants include anionic, cationic, nonionic and ampholytic surfactants. These surfactants are described in the book, *Surface Active Agents and Detergents*, by Schwartz, Perry and Berch, Interscience Publishers, Inc., New York, N.Y., hereby incorporated by reference. Anionic surfactants include carboxylic acids, i.e., fatty acids, resin acids, tall oil acids, and acids from paraffin oxidation products.

Included among the anionic surfactants are sulfuric esters, alkane sulfonates, alkylaryl sulfonates, mahogany and petroleum sulfonates, phosphates, and lignin derivatives. A particularly useful anionic surfactant is saponin, a plant glucoside which forms a colloidal solution in water. This surfactant is preferred for use within the scope of the instant invention. This surfactant is a natural product and has not been structurally identified. Saponin is described in Hackh's *Chemical Dictionary*, as having a formula weight of 726.5, which corresponds to the formula $C_{32}H_{54}O_{18}$.

The cationic surfactants include quaternary ammonium compounds, e.g., salts of long-chain primary alkyl amines including octadecylamine and dodecylamine. The secondary and tertiary amine salts and quaternary ammonium salts having from seven to 40 carbons, are all effective surfactants.

Nonionic systems include the polyethenoxy surfactants, i.e., polyethoxy ethers of alkyl phenols, polyethoxy ethers of alcohols, polyethenoxy esters, etc. The polyethenoxy ethers are especially useful in the above invention as their solubility may be varied according to the weight of ethylene oxide added to the alkyl phenol starting material. Thus, stable emulsions can usually be obtained by utilizing these systems. Another nonionic surfactant which is particularly useful within the scope of the instant invention is sorbitan monooleate, which is known by the trade name of SPAN-80 and manufactured by the Atlas Chemical Co. This surfactant is hydrocarbon-soluble and is useful in preparing non-aqueous liquid surfactant membranes.

Ampholytic surfactants contain both an acidic and basic function in their structure and therefore will be cationic or anionic according to the pH of the solution in which they are dissolved. An example of this class is dodecyl beta alanine. The surfactant may comprise from 0.1 to 90 percent by weight of the liquid surfactant membrane, preferably from 0.1 to 5 percent.

Membrane strengthening additives can be added to the liquid surfactant membrane to increase the stability from rupture. Since it is critical that the liquid surfactant membrane remain intact, the addition of additives which will strengthen the membrane is particularly preferred. Additives such as polyethylene glycol, polyvinyl alcohol, cellulose derivative such as methyl-cellulose, etc. can be used within the scope of the instant invention. The membrane strengthening additive may comprise from about 0.1 to 99 percent by weight of liquid surfactant membrane, preferably 1 to 90 percent.

Buffers may be added to the liquid surfactant membrane where it is desirable to stabilize the pH. This is especially effective where the enzyme is only active at a certain pH and the enzyme is incorporated in the liquid surfactant membrane. Buffers known in the art, i.e., sodium hydrogen phosphates, are illustrative of compounds which might be used.

The choice of the components of the liquid surfactant membrane, i.e., surfactant, membrane strengthening additive, and/or buffer, must be made with a view toward the permeation properties of the membrane to the desired component of the feedstream of the reaction product. For example, where the feedstream is in the interior phase of the liquid surfactant membrane, the membrane must be permeable to the component which is desired to be reacted with an enzyme present in the solvent or exterior phase.

In the case where the enzyme is present in the liquid surfactant membrane, the components of the liquid surfactant membrane must be chosen further with a view toward retaining the activity of the enzyme. That is, components which will inactivate enzyme catalysts should not be used in the liquid surfactant membrane. The choice will be apparent to the skilled worker in the enzyme catalysis field. The choice of particular liquid surfactant membrane components which should not be used with enzymes may be made on the following basis:

Liquid surfactant salts containing thiocyanate, iodide, perchlorate, lithium, calcium or barium tend to dissolve, denature and disassociate proteins, therefore, should not be used. The addition of an aromatic group, particularly one with nitro substituents tend to increase inactivation of enzymes. Surfactants which tend to increase the exposure of hydrophobic groups of enzymes to solvent action, such as alcohols, acetone and related compounds, are not suitable for obtaining maximum efficiency. In addition, surfactants containing specific functional groups which interact with amide and peptide groups of the enzyme catalyst should not be used since they inactivate the enzymes by denaturization.

The enzyme catalysts which can be used within the process of this invention are otherwise illimitable. The enzyme catalyst will be chosen according to the reaction which is desired. Enzymes which are useful in industrial processes include the carbohydrates, for example alpha-amylase, beta-amylase, amylogulcosidase, maltase, cellulase-hemicellulase; proteases, e.g. pepsin, trypsin, rennin, ficin, etc.; lipases; pectic enzymes, e.g. pectin-methylesterase, depolymerase, protopectinase; glucose oxidase; and etc. The use of all the above enzymes will be known by the worker skilled in the art of enzyme catalysis.

Processes of particular interest include production of glucose from starch using bound amylase and amyloglucosidase, optical revolution of DL-amino acids by water-insoluble aminoacylase, selective hydroxylation by passing a solution of a complex steroid through a column of a hydrophilic gel matrix wherein a specific steroid dehydrogenase is trapped, for example, such systems have been tried, on a large scale, to biocatalytically convert cortisol to prednisolone. Any molecule including for instance complex antibiotics can be synthesized at least in part by passing a suitable starting material through a battery of enzyme columns, each effecting a single transformation with a high degree of selectively and specificity.

In general, the enzyme comprises from about 0.1 to 50 percent by weight of the phase in which it is present. Preferably it will comprise from about 0.1 to 10 percent.

The feedstream is chosen according to the reaction and separation desired. Of course, the feedstream must be one which is known in the art to contain components which can be reacted by contacting with enzymes. For example, in a process for preparing 1-octanol, a feedstream comprising normal octane will be utilized. Of course, the enzyme will be chosen according to the reaction which is desired and in the aforementioned example, the enzyme ω-hydroxylase may be utilized. This specific enzyme can be isolated from *Pseudomonas oleovorans* by the method described by E. J. McKenna and M. J. Coon, *Journal of Biological Chemistry*, 245, 3,882–3,889 (1970). Another example of a feedstream from which components can be reacted and separated by the process of this invention is aqueous phenol solutions. These feedstreams are known in the industry and result from cracking processes or partial oxidation techniques where aromatics and oxygen-containing compounds react at elevated temperatures. In this process the aforesaid feedstream is contacted with a hydrocarbon surfactant membrane comprising SPAN-80, which coats an interior phase containing mushroom polyphenoloxidase catalyst, and which can be obtained from Worthington Biochemical Corporation, Freehold, New Jersey. The phenol in the feedstream permeates the membrane, is oxidized in the interior phase and remains separated from the outside feedstream, because of the non-permeability of the liquid membrane to the oxidized product.

Municipal waste water, containing nitrates and nitrites, may be treated by the process of this invention, wherein specific reductase systems are utilized to reduce the nitrites and nitrates to nitrogen.

Hydrocarbons in refinery waste waters may be oxidized or reduced within the scope of the instant invention by utilizing the appropriate enzyme catalyst.

The solvent phase is chosen to specifically solubilize either the desired permeable component of the feedstream or the desired reaction product. For example, when the reaction takes place in the interior phase, i.e. when the feedstream is surrounded by the liquid surfactant membrane, the solvent will be chosen for its ability to solubilize the desired reaction product. When the solvent is in the interior phase, and the enzyme also, the solvent will be chosen for its ability to solubilize the desired permeable component of the outside feedstream phase.

Solvents which can be utilized within the scope of the instant invention include water, hydrocarbons, fluorinated hydrocarbons, alcohols, ethers, and etc. Of course, where the enzyme is in contact with the solvent phase, the solvent must be chosen so as not to inactivate the enzyme.

The process of the instant invention can be run at any temperature in which the components are a liquid. Usually room temperature is preferred. The temperature may affect the enzyme activity and thus will be varied according to such effect. In general, the temperature of from −20° to +70° C. is utilized.

The pressure is not critical also and must only be sufficient to maintain all the ingredients, i.e. the surfactant, the solvent, and the feedstream in the liquid phase. Ambient pressures, therefore, example 1 atmosphere, can be used in the process of this invention.

The process of the instant invention can be run in a batch or continuous manner. In a continuous process an emulsion of two immiscible phases are formed. The outside phase will be the liquid surfactant membrane. This emulsion is contacted by bubbling through a tubular reactor containing a solvent. The solvent is chosen according to the density of the liquid surfactant membrane bubbles. This is, if the liquid surfactant membrane containing the interior phase is to be collected at the top, the solvent should be heavier than the liquid surfactant membrane. The liquid surfactant membrane feedstream can also be introduced in the top and descend through the column of solvent to be collected on the bottom. In this case the solvent will be lighter than the liquid surfactant membrane. Of course, it is important that the liquid surfactant membrane is immiscible with the solvent phase. The contact time with the solvent is chosen so that sufficient permeation can occur from the interior phase into the solvent phase or vice versa. This can be altered by the length of the column of solvent.

Following this contact, the solvent and emulsion phase are separated and the phase containing the desired reaction products is treated to remove said reaction products. For example, where the reaction products are in the emulsion phase the emulsion can be broken by methods known in the art and the interior phase containing the reaction products separated therefrom. This interior phase will be further treated by distillation, etc., to remove pure reaction product.

Where the reaction product is in the solvent phase, there is no need to break the emulsion, of course, and this phase is treated directly to liberate the reaction product.

The following are specific embodiments of the instant invention and are not meant to limit its scope.

Example 1. Hydrocarbon Hydroxylation System

The reaction-separation system employed here is used to selectively produce and isolate 1-octanol from n-octane. The membrane-contained catalyst utilized to affect this specific conversion is the enzyme ω-hydroxylase, which is isolated from Pseudomonas oleovorans by the method described by E. J. McKenna and M. J. Coon, J. Biol. Chem., 245, 3882–3889 (1970). This three-component enzyme can selectively convert n-alkanes to their corresponding l-alkanols.

20 mg rubredoxin [prepared as J. A. Peterson and M. J. Coon, J. Biol. Chem., 243, 329–334 (1968)], 3 mg spinach ferridoxin-TPN reductase [prepared as M. Shim, K. Tagawa, and D. I. Arnon, Biochem. Z., 338, 84 (1963)], 20 mg of Pseudomonas ω-hydroxylase, and 1 g of nicotinamide adenine dinucleotide are dissolved in 60 g of 0.1M sodium phosphate buffer, pH 7.0 140 g glycerol and 0.4 g saponin are added to the buffered catalyst solution. 200 g n-octane is added to the above surfactant solution and the mixture is subjected to a high shear field to produce a stable emulsion. This emulsion is quickly combined with 800 g water-saturated propionaldehyde, stirred for one hour in air, and the propionaldehyde layer is allowed to separate on standing. The propionaldehyde containing l-octanol is decanted from the emulsion and stripped at 49° C. to yield the pure l-octanol residue, which is collected. The emulsion phase is disrupted by centrifugation, additional octane is added, and the entire procedure is recycled as desired.

Example 2. Phenol Oxidation System

The reaction-separation system employed here is used to remove and oxidize small quantities of phenol from aqueous solution. The catalyst, polyphenol oxidase, is contained in aqueous solution by a viscous hydrocarbon liquid membrane to affect the desired separation and conversion.

The hydrocarbon surfactant membrane is prepared by mixing 2 g SPAN-80, 1 g ENJ, and 97 g S-100 hydrocarbon. 5 mg mushroom polyphenol oxidase catalyst (obtained as a lyophilized preparation from Worthington Biochemical Corp., Freehold, New Jersey) was dissolved in 100 g 0.05M tris buffer, pH 7.0 to produce the inside phase. The enzyme catalyst-containing inside phase and hydrocarbon surfactant phase were stirred at 500 rpm for 20 minutes to produce a stable emulsion. 115 g of 0.5 mM phenol in 0.05M tris buffer, pH 7.0 and 91.2 g of the emulsion were combined in a 250 ml separatory funnel. The removal of phenol from the outside phase was monitored by sampling this phase after 12 and 18 hand shakes of the separatory funnel. The absorbance difference between 270m$\mu$ and 245 m$\mu$ was used as a measure of phenol concentration. The results indicate that phenol is rapidly removed from the outside phase. Likewise, the appearance of oxidized product in the inside

| No. of Shakes | Phenol in outside phase($A_{270}-A_{245}$) |
|---|---|
| 0 | 0.79 |
| 12 | 0.51 |
| 18 | 0.36 | phase was confirmed by comparison of the ultraviolet spectrum of that phase, following configuration at 10,000 rpm for 20 minutes, with the spectrum of known oxidized product. The oxidized product is characterized by the relatively high $A_{245}/A_{270}$ ratio of 1.03 as compared with 0.12 for the initial phenol reactant.

Example 3. Phenol Oxidation System

The catalyst, polyphenol oxidase, is contained in an aqueous surfactant membrane. Phenol in cyclohexane solution perfuses from the outside phase through the membrane, where it is oxidized. The oxidized product is recovered in the inside cyclohexane phase.

The aqueous surfactant membrane was prepared by combining 0.4 g saponin, 10 mg mushroom polyphenol oxidase (Worthington Biochemical Corp.), 100 g glycerol, and 99.6 g 0.05M tris buffer, pH 7.0. This membrane was stirred at 500 rpm for 20 minutes with 200 g spectral grade cyclohexane to produce a stable emulsion. 100 ml of this emulsion was combined with 100 ml of a phenol solution in cyclohexane (0.1 g/200 g) in a 250 ml separatory funnel. The removal of phenol from the outside phase was monitored by sampling this phase after 3, 6, 12, 18, and 24 hand shakes of the separatory funnel. The absorbance difference between 265 m and 240 m$\mu$ was used as a measure of phenol concentration. The results indicate that phenol is

| No. of Shakes | Phenol in outside phase ($A_{265}/A_{240}$) |
|---|---|
| 0 | 1.85 |
| 3 | 1.39 |
| 6 | 0.95 |
| 12 | 0.63 |
| 18 | 0.44 |
| 24 | 0.35 | rapidly removed from the outside phase. Likewise, the appearance of oxidized product in the inside phase was confirmed by comparison of the ultraviolet spectrum of that phase, following centrifugation at 10,000 rpm for 20 mins. with the spectrum of known oxidized product. The oxidized product in cyclohexane is characterized by the relatively high $A_{240}/A_{265}$ ratio of 0.56 as compared with 0.08 for the initial phenol reactant in cyclohexane.

Example 4 Nitrate Removal

In this experiment a simulated waste water stream (1% $KNO_3$ at pH 6.8) is contacted with a liquid membrane system comprising 2% SPAN 80, 5% ENJ 3029 (a high molecular weight amine) and 93% S-100 (an isoparaffin) as the exterior phase and 25 ml of nitrate reductase having 5 percent specific activity and 20 gms of sucrose as the interior phase. After 30 minutes, the indicators in the interior phase changed from colorless to rose pink indicating that the nitrates have permeated from the simulated waste water into the interior phase and reduced to lower oxides of nitrogen.

The above experiment was run in a separatory funnel in the following manner: The simulated waste water phase was transferred to the separatory funnel, followed by the exterior phase, which being of lighter density and immiscible with the waste water phase, formed a distinct layer over the waste water phase. The enzyme solution was added dropwise, forming droplets coated with the exterior phase, which sank to the bottom of the separatory funnel. As the droplets fell through the waste water phase, the nitrates present therein permeated into the interior phase and reduced therein biocatalytically to lower oxides of nitrogen.

What is claimed is:

1. A process for separating at least one component of a feedstream by permeation through a liquid surfactant membrane, and reacting at least one of said separated components which comprises, (a) mixing a solvent, which will selectively solubilize at least one component of the feedstream, with an enzyme which selectively catalyzes the reaction of at least one of said solubilized components, (b) forming droplets of the aforesaid mixture, (c) coating said droplets with a liquid surfactant membrane which is permeable to at least one component of said feedstream and which comprises a surfactant, and (d) contacting said coated droplets with the feedstream whereby at least one component of the feedstream permeates the liquid surfactant membrane and is reacted by contacting with said enzyme.

2. The process of claim 1 wherein steps (b) and (c), together, comprise emulsifying said solvent in said liquid surfactant membrane mixture.

3. The process of claim 2 wherein the liquid surfactant membrane comprises from about 0.1 to 90 percent by weight of a surfactant.

4. The process of claim 3 wherein the liquid surfactant membrane is nonaqueous.

5. The process of claim 4 wherein said enzyme catalyst is water soluble.

6. The process of claim 4 wherein said surfactant is sorbitan monooleate.

7. The process of claim 5 wherein said feedstream is a waste water stream said desired component is phenol, and said enzyme catalyst comprises mushroom polyphenol oxidase.

8. The process of claim 5 wherein said feedstream comprises a waste water stream, said desired component is a nitrate, and said enzyme catalyst comprises nitrate reductase.

9. The process of claim 3 wherein the liquid surfactant membrane is aqueous.

10. The process of claim 9 wherein said surfactant is saponin.

11. A process for reacting at least one component of a feedstream by contacting said component with an enzyme catalyst whereby said component is reacted, and separating at least one of said reacted components by permeation through a liquid surfactant membrane, which comprises (a) mixing a feedstream with an enzyme which selectively catalyzes reaction of at least one of the feedstream components, (b) forming droplets of the aforesaid mixture, (c) coating said droplets with a liquid surfactant membrane, which is permeable to at least one of said reacted components and which comprises a surfactant, and (d) contacting said coated droplets with a solvent whereby at least one of said reacted components permeates through the liquid surfactant membrane into said solvent.

12. The process of claim 11 wherein steps (b) and (c), together, comprise emulsifying said feedstream in said liquid surfactant membrane mixture.

13. The process of claim 11 wherein the liquid surfactant membrane comprises from about 0.1 to 90 percent by weight of a surfactant.

14. The process of claim 13 wherein the liquid surfactant membrane is nonaqueous.

15. The process of claim 14 wherein said enzyme catalyst is water soluble.

16. The process of claim 14 wherein said surfactant is sorbitan monooleate.

17. The process of claim 15 wherein said feedstream is aqueous, said desired component is phenol, and said enzyme catalyst comprises mushroom polyphenol oxidase.

18. The process of claim 15 wherein said feedstream is aqueous, said desired component is a nitrate, and said enzyme catalyst comprises nitrate reductase.

19. The process of claim 11 wherein the liquid surfactant membrane is aqueous.

20. The process of claim 19 wherein said surfactant is saponin.

21. A process for separating at least one reaction product of a process wherein a feedstream is contacted with an enzyme catalyst which selectively catalyzes the reaction of at least one component of said feedstream which comprises (a) forming droplets of said feedstream, (b) coating said droplets with a liquid surfactant membrane, said membrane comprising a surfactant and an enzyme catalyst which is a catalyst for the reaction of at least one component of said feedstream, and said membrane being permeable to at least one of said feedstream components, and (c) contacting said coated droplets with a solvent, whereby at least one component of said feedstream permeates into said liquid surfactant membrane where it is contacted with an enzyme and reacted, and whereby at least one of said reacted components permeates into said solvent.

22. The process of claim 21 wherein steps (a) and (b), together, comprise emulsifying said feedstream in an enzyme containing liquid surfactant membrane mixture.

23. The process of claim 22 wherein the liquid surfactant membrane comprises from about 0.1 to 90 percent by weight of a surfactant.

24. The process of claim 23 wherein the liquid surfactant membrane is nonaqueous.

25. The process of claim 24 wherein said enzyme catalyst is water soluble.

26. The process of claim 24 wherein said surfactant is sorbitan monooleate.

27. The process of claim 25 wherein said feedstream is aqueous, said desired component is phenol, and enzyme catalyst comprises mushroom polyphenol oxidase.

28. The process of claim 25 wherein said feedstream is aqueous, said desired component is a nitrate, and said enzyme catalyst comprises nitrate reductase.

29. The process of claim 23 wherein the liquid surfactant membrane is aqueous.

30. The process of claim 29 wherein said surfactant is saponin.

31. A process for separating at least one component of a feedstream by permeation through a liquid surfactant membrane, and reacting at least one of said separated components which comprises, (a) forming droplets of said feedstream, (b) coating said droplets with a liquid surfactant membrane which is permeable to at least one component of said feedstream and which comprises a surfactant, and (c) contacting said feedstream with a solvent which selectively solubilizes at least one of said permeable components, and said solvent further comprising an enzyme catalyst which selectively catalyzes the reaction of at least one of said solubilized, permeable components, whereby at least one component of said feedstream permeates the liquid surfactant membrane and is reacted by contacting with said enzyme.

32. The process of claim 31 wherein steps (a) and (b), together, comprise emulsifying said feedstream in a liquid surfactant membrane mixture.

33. The process of claim 31 wherein the liquid surfactant membrane comprises from about 0.1 to 90 percent by weight of a surfactant.

34. The process of claim 33 wherein the liquid surfactant membrane is nonaqueous.

35. The process of claim 34 wherein said enzyme catalyst is water soluble.

36. The process of claim 34 wherein said surfactant is sorbitan monooleate.

37. The process of claim 35 wherein said feedstream is aqueous, said desired component is phenol, and said enzyme catalyst comprises mushroom polyphenol oxidase.

38. The process of claim 35 wherein said feedstream is aqueous, said desired component is a nitrate, and said enzyme catalyst comprises nitrate reductase.

39. The process of claim 33 wherein the liquid surfactant membrane is aqueous.

40. The process of claim 39 wherein said surfactant is saponin.

41. A process for reacting at least one component of a feedstream by contacting said component with an enzyme catalyst whereby said component is reacted, and separating at least one of said reacted components by permeation through a liquid surfactant membrane, which comprises (a) forming droplets of a solvent which selectively solubilizes at least one of said reacted components, (b) coating said droplets with a liquid surfactant membrane which is permeable to at least one of said reacted components, and (c) contacting said coated droplets with a mixture comprising said feedstream and said enzyme, said enzyme being a catalyst for the reaction of at least one of said feedstream components, whereby at least one of said reacted components permeates through said liquid surfactant membrane into said solvent.

42. The process of claim 41 wherein steps (a) and (b), together, comprise emulsifying said solvent in a liquid surfactant membrane mixture.

43. The process of claim 41 wherein the liquid surfactant membrane comprises from about 0.1 to 90 percent by weight of a surfactant.

44. The process of claim 43 wherein the liquid surfactant membrane is nonaqueous.

45. The process of claim 44 wherein said enzyme catalyst is water soluble.

46. The process of claim 44 wherein said surfactant is sorbitan monooleate.

47. The process of claim 45 wherein said feedstream is aqueous, said desired component is phenol, and said enzyme catalyst comprises mushroom polyphenol oxidase.

48. The process of claim 45 wherein said feedstream is aqueous, said desired component is a nitrate, and said enzyme catalyst comprises nitrate reductase.

49. The process of claim 43 wherein the liquid surfactant membrane is aqueous.

50. The process of claim 49 wherein said surfactant is saponin.

51. A process for separating at least one reaction product of a process wherein a feedstream is contacted with an enzyme catalyst which selectively catalyzes the reaction of at least one component of said feedstream which comprises (a) forming droplets of a solvent which is selectively soluble for at least one of said reacted components, (b) coating said solvent with a liquid surfactant membrane, said membrane being permeable to at least one component of said feedstream and said liquid surfactant membrane further comprising an enzyme which is a catalyst for the reaction of at least one of said permeable components, and (c) contacting said coated droplets with said feedstream whereby at least one component of said feedstream permeates into said liquid surfactant membrane where it is contacted with an enzyme and reacted, and whereby at least one of said reacted components permeates into said solvent.

52. The process of claim 51 wherein steps (a) and (b), together, comprise emulsifying said feedstream in an enzyme containing liquid surfactant membrane mixture.

53. The process of claim 51 wherein the liquid surfactant membrane comprises from about 0.1 to 90 percent by weight of a surfactant.

54. The process of claim 53 wherein the liquid surfactant membrane is nonaqueous.

55. The process of claim 54 wherein said enzyme catalyst is water soluble.

56. The process of claim 54 wherein said surfactant is sorbitan monooleate.

57. The process of claim 55 wherein said feedstream is aqueous, said desired component is phenol, and said enzyme catalyst comprises mushroom polyphenol oxidase.

58. The process of claim 55 wherein said feedstream is aqueous, said desired component is a nitrate, and said enzyme catalyst comprises nitrate reductase.

59. The process of claim 53 wherein the liquid surfactant membrane is aqueous.

60. The process of claim 59 wherein said surfactant is saponin.

* * * * *